May 16, 1933. J. K. LUND 1,909,413
AIR VALVE
Filed Aug. 1, 1929
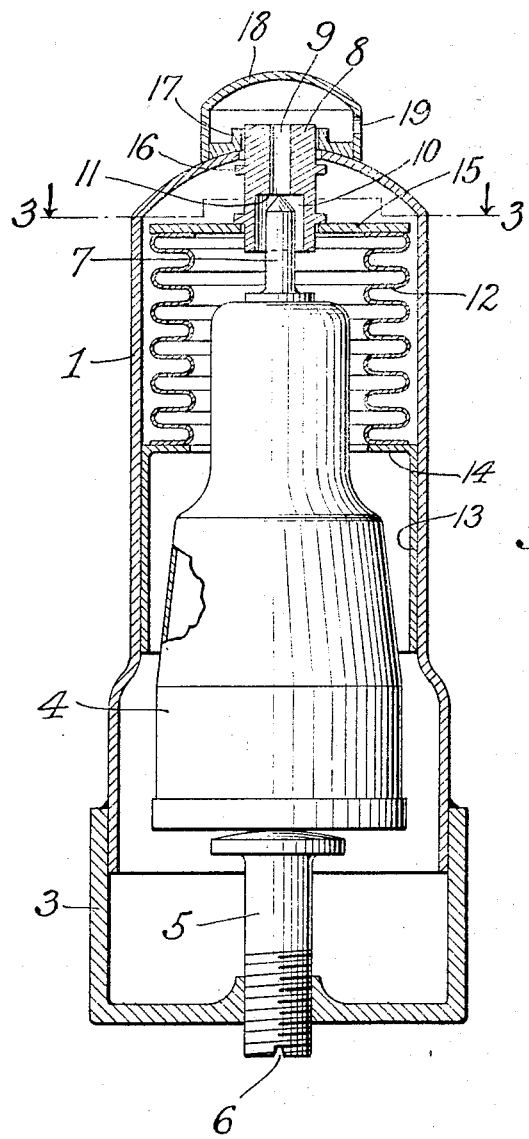
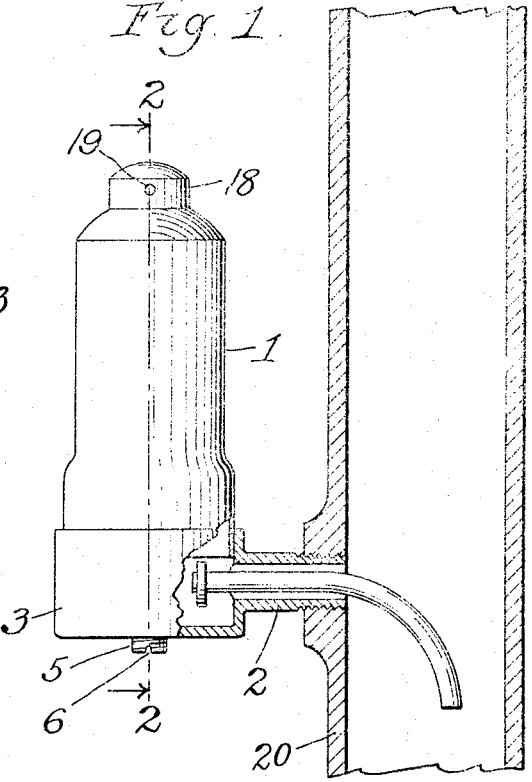
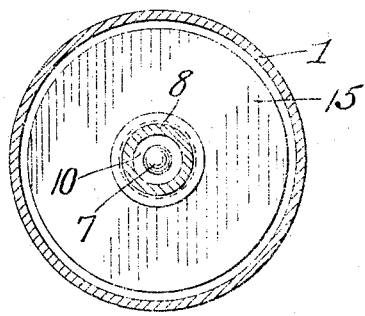
Inventor
James K. Lund
by Parker & Carter
Attorneys Patented May 16, 1933

1,909,413

UNITED STATES PATENT OFFICE

JAMES K. LUND, OF CHICAGO, ILLINOIS, ASSIGNOR TO DOLE VALVE COMPANY, OF CHICAGO, ILLINOIS, A CORPORATION OF ILLINOIS

AIR VALVE

Application filed August 1, 1929. Serial No. 382,739.

This invention relates to air valves and has for its object to provide a new and improved device of this description.

The invention has as a further object to provide an air valve which will permit the escape of air from the radiator and prevent the escape of water and which will also hold a vacuum in the radiator and the heating system.

The invention has as a further object to provide an air valve cheap in construction and efficient in operation and which can also be used to maintain a vacuum in the system when the pressure of the steam is reduced below atmospheric pressure.

The invention has further objects which are more particularly pointed out in the accompanying description.

Referring now to the drawing, Fig. 1 is a view showing one form of air valve embodying the invention.

Fig. 2 is an enlarged sectional view taken on line 2—2 of Fig. 1.

Fig. 3 is an enlarged sectional view taken on line 3—3 of Fig. 2.

Like numerals refer to like parts throughout the several figures.

Referring now to the drawing, I have shown a construction wherein there is a casing 1 provided with an inlet 2 which is connected with the radiator. The casing may be in a single piece but is preferably formed of two pieces, the base 3 being separate from the remaining portion. This simplifies the construction. Within the casing is a hollow receptacle 4. This receptacle contains an expansible fluid which expands under heat and is supported upon an adjustable support 5 shown as a screw threaded member working in a threaded hole in the casing and provided with a slot 6 for an instrument by which it is turned to adjust it.

Connected with the receptacle 4 is a valve member 7 which co-operates with the seating member 8. This seating member is provided with a passageway 9 through which air escapes from the radiator. This passageway is enlarged at 10 and the valve member 7 projects into this enlarged portion of the passageway and is arranged to engage the seat 11 under predetermined conditions so as to close the passageway 9 and prevent air or liquid from passing therethrough. When steam passes into the casing 1 it expands the fluid in the receptacle 4 and the bottom of said receptacle is pressed outwardly so as to lift the receptacle and cause the seating member to engage its seat and prevent the escape of the steam.

When water enters the casing the receptacle acts as a float and is moved so that the valve element 7 engages its seat thereby preventing the escape of the water. Some means is provided for holding a vacuum in the system when the steam pressure is reduced. The present device is arranged to maintain this vacuum. In the particular construction shown the seating member 8 is connected with it so that its position will be controlled by the pressure element. The pressure element shown consists of a bellows 12 connected at its lower end to a fixed member 13 attached to the casing. This member has an inwardly projecting flange 14 with which the end of the bellows is connected. The top 15 of the bellows is provided with an opening into which the seating member 8 is received and through which the valve member 7 projects. The seating member 8 projects through an opening in the casing 1 and is provided with a stop 16 which limits its upward movement. The opening in the casing for the seating member is provided with an angular collar 17 which provides an extended surface opposed to the seating member so as to prevent binding of the seating member in the opening. There is sufficient clearance also to prevent binding and to permit air to enter the casing above the pressure device.

The casing is provided with a removable cap 18 which covers the end of the seating member and which is provided with an escape opening 19 to permit the escape of the air passing through the passageway 9.

The use and operation of my invention are as follows:

When the pressure on each side of the top 15 of the pressure device is equal, the parts will be as shown in Fig. 2 with the passageway 9 open so that air may escape. If now water passes into the casing 1, the receptacle 4 will be lifted so that the seating element 7 engages the seat 11 and closes the pasageway 9 thereby preventing the escape of the water. When the water subsides, the passageway 9 will be again open. When steam from the radiator passes into the casing 1 the expanding fluid in the receptacle 4 will be expanded and the bottom of said receptacle will be pressed outwardly and since it engages the stop 5, this will lift the receptacle and cause the valve element 7 to seat and close the passageway 9 thus preventing the escape of the steam. If, now the steam pressure is lowered and falls below atmospheric pressure, as where the system is shut down at night, the pressure in the casing 1 below the top 15 of the bellows 12 is reduced and since there is atmospheric pressure above said bellows, this atmospheric pressure presses the bellows down, the seating member 8 moving with the bellows and being moved down so as to engage the valve member 7 and close the passageway 9.

It will thus be seen that by means of this construction the vacuum in the system will be maintained. When the steam pressure is raised above atmospheric pressure the bellows will be moved up carrying with it the seating member 8 so as to open the passageway 9 and permit the escape of air.

In Fig. 1 I have shown the air valve as connected with a radiator 20.

I claim:—

1. An air valve comprising a casing, an opening therein, a receptacle in said casing containing an expansible fluid, a valve member connected with said receptacle, a seating member projecting loosely through the opening in the casing and provided with a passageway leading to the exterior of the casing and a pressure device with which said seating member is connected so as to be moved to seat upon the valve member when the pressure in the casing falls below atmospheric pressure said seating member being provided with a stop adapted to engage said casing when the seating member is moved upwardly the upper end of the receptacle containing the expansible fluid projecting part way into the pressure device.

2. An air valve comprising a casing, a receptacle therein containing an expansible fluid, a bellows in said casing the upper end of the receptacle containing the expansible fluid projecting into the bellows so as to be surrounded thereby having one end connected with the casing, said bellows being provided with a top member having an opening therethrough, a seating member connected with said bellows and having a passageway which communicates with the atmosphere, a valve member on said receptacle adapted to co-operate with said seating member and close said passageway when the pressure in the casing falls below atmospheric pressure, and means connected with said seating member and engaging the casing when the seating member is moved upwardly for limiting the movement of said seating member with relation to said casing.

3. An air valve comprising a casing, a receptacle therein containing an expansible fluid, a bellows in said casing open at the bottom, a supporting device therefor connected with the casing having an inwardly projecting flange surrounding the upper part of the receptacle containing expansible fluid and with which the lower end of the bellows is connected, said bellows being provided with a top member having an opening therethrough, a seating member connected with said top member provided with a passageway connecting the interior of the bellows with the exterior of the casing, the casing being provided with an opening in which the seating member is slidably mounted.

4. An air valve comprising a casing, a receptacle therein containing an expansible fluid, a bellows in said casing open at the bottom, a supporting device therefor connected with the casing and with which the lower end of the bellows is connected, said bellows being provided with a top member having an opening therethrough, a seating member connected with said top member provided with a passageway connecting the interior of the bellows with the exterior of the casing, the casing being provided with an opening in which the seating member is slidably mounted, the opening in the casing being provided with an angular collar having an extended surface opposed to the seating element and an extended surface engaging the casing.

Signed at Chicago, county of Cook and State of Illinois, this 25th day of July 1929.

JAMES K. LUND.